(12) United States Patent
Du Tertre et al.

(10) Patent No.: US 10,451,006 B2
(45) Date of Patent: Oct. 22, 2019

(54) PROPULSION CHAMBER WITH REINFORCING FIBER BELTS AND A METHOD OF FABRICATING THE PROPULSION CHAMBER

(71) Applicant: AIRBUS SAFRAN LAUNCHERS SAS, Issy-les-Moulineaux (FR)

(72) Inventors: Alban Du Tertre, Vernon (FR); Didier Guichard, Menilles (FR); Cedric Pierre Michel Thomas, Palaiseau (FR)

(73) Assignee: ARIANEGROUP SAS, Paris (FR)

(*) Notice: Subject to any disclaimer, the term of this patent is extended or adjusted under 35 U.S.C. 154(b) by 147 days.

(21) Appl. No.: 15/296,537

(22) Filed: Oct. 18, 2016

(65) Prior Publication Data
US 2017/0107945 A1    Apr. 20, 2017

(30) Foreign Application Priority Data
Oct. 20, 2015 (FR) .................. 15 60003

(51) Int. Cl.
*F02K 9/52* (2006.01)
*F02K 9/64* (2006.01)
(Continued)

(52) U.S. Cl.
CPC .............. *F02K 9/64* (2013.01); *B29C 70/345* (2013.01); *B29C 70/48* (2013.01); *F02K 9/52* (2013.01);
(Continued)

(58) Field of Classification Search
CPC ..... F02K 9/00; F02K 9/62; F02K 9/64; F02K 9/972; F02K 9/974; F02K 9/34;
(Continued)

(56) References Cited

U.S. PATENT DOCUMENTS 2,958,183 A * 11/1960 Singelmann .............. F02K 9/64
138/111
3,235,947 A *  2/1966 Sohlemann ............ B21D 53/02
138/111
(Continued)

FOREIGN PATENT DOCUMENTS

DE   10 2014 100 345 A1   7/2015
EP        1 227 071 A2   7/2002
WO    WO 2015/055924 A1   4/2015

OTHER PUBLICATIONS

French Preliminary Search Report dated Jul. 4, 2016 in French Application 15 60003 filed on Oct. 20, 2015 (with English Translation of Categories of Cited Documents).

*Primary Examiner* — Alain Chau
(74) *Attorney, Agent, or Firm* — Oblon, McClelland, Maier & Neustadt, L.L.P.

(57) ABSTRACT

A propulsion chamber for a liquid propellant rocket engine is provided. The propulsion chamber includes an inside wall made of metal, an outside covering made of organic matrix composite material, and a cooling circuit arranged between the outside covering and the inside wall. The propulsion chamber further includes at least a first axial endpiece secured to the metal inside wall and presenting at least one radial protrusion received in a concave recess in an inside face of the outside covering. The concave recess is situated axially between first and second belts of reinforcing fibers oriented substantially circumferentially in the outside covering in such a manner as to take up forces associated with inside pressure and thrust.

16 Claims, 17 Drawing Sheets

(51) Int. Cl.
  *F02K 9/97* (2006.01)
  *B29C 70/34* (2006.01)
  *B29C 70/48* (2006.01)
  *B29L 31/30* (2006.01)
  *B29K 101/10* (2006.01)
  *B29K 307/04* (2006.01)

(52) U.S. Cl.
  CPC .......... *F02K 9/972* (2013.01); *B29K 2101/10* (2013.01); *B29K 2307/04* (2013.01); *B29L 2031/3097* (2013.01); *F05D 2220/80* (2013.01); *F05D 2230/30* (2013.01); *F05D 2240/35* (2013.01); *F05D 2300/603* (2013.01)

(58) Field of Classification Search
  CPC ... F02K 9/343; F02K 9/40; F02K 9/60; F02K 9/42; F02K 9/52; F02K 9/32; F02K 7/18; B29C 70/345; B29C 70/48; B23P 15/008; B29L 2031/3097; B29K 2101/10; B29K 2307/04; F05D 2220/80; F05D 2230/30; F05D 2240/35; F05D 2300/603
  See application file for complete search history.

(56) References Cited

U.S. PATENT DOCUMENTS

| | | | | |
|---|---|---|---|---|
| 3,280,850 A * | 10/1966 | Aylor | ............... | B29C 53/805 138/153 |
| 3,507,449 A * | 4/1970 | Karl | ............... | F02K 9/64 165/134.1 |
| 3,568,929 A * | 3/1971 | Butter | ............... | F02K 9/60 239/127.1 |
| 3,768,256 A * | 10/1973 | Butter | ............... | F02K 9/64 165/169 |
| 4,585,136 A * | 4/1986 | Clark | ............... | B29C 70/86 220/288 |
| 5,160,392 A * | 11/1992 | Thongs, Jr. | ............... | B29C 53/585 156/172 |
| 5,363,645 A * | 11/1994 | Pellet | ............... | F02K 9/64 165/907 |
| 6,582,542 B1 * | 6/2003 | Russell | ............... | B23P 15/008 156/156 |
| 6,829,884 B2 * | 12/2004 | Fint | ............... | B23P 15/008 239/127.1 |
| 6,889,496 B2 * | 5/2005 | Beyer | ............... | B23P 15/008 29/890.01 |
| 8,062,452 B2 * | 11/2011 | Lalande | ............... | B29C 70/222 156/169 |
| 9,759,163 B2 * | 9/2017 | Indersie | ............... | F02K 9/34 |
| 2002/0178712 A1 * | 12/2002 | Linner | ............... | F02K 9/62 60/257 |
| 2005/0188678 A1 * | 9/2005 | Haggander | ............... | F02K 9/343 60/266 |
| 2009/0235636 A1 * | 9/2009 | Oehrlein | ............... | F02K 7/18 60/200.1 |
| 2010/0031626 A1 * | 2/2010 | Oehrlein | ............... | B29C 70/446 60/200.1 |
| 2010/0229565 A1 * | 9/2010 | Boman | ............... | F02K 9/64 60/752 |
| 2013/0219901 A1 * | 8/2013 | Indersie | ............... | F02K 9/34 60/770 |

* cited by examiner

PROPULSION CHAMBER WITH REINFORCING FIBER BELTS AND A METHOD OF FABRICATING THE PROPULSION CHAMBER

BACKGROUND OF THE INVENTION

The present invention relates to the field of rocket engine propulsion chambers and to fabricating them.

More particularly, the present invention relates to combustion chambers having a metal inside wall, an outside covering, and a cooling circuit. Typically, such combustion chambers are used in rocket engines using liquid propellants and a regenerative feed circuit, with at least one of the propellants then passing through the cooling circuit of the combustion chamber in order to cool its inside wall while being heated prior to being injected into the combustion chamber. The metal inside wall ensures heat transmission from the inside of the combustion chamber to the cooling circuit.

Normally, the outside covering represents the main structural element of such a combustion chamber. In particular, it takes up the pressure forces from the inside of the combustion chamber, and also the thrust generated by the rocket engine, and various dynamic forces to which the rocket engine is subjected in operation.

In the state of the art, known combustion chambers usually have an outside covering that is likewise made of metal, and in particular of nickel. Nevertheless, such a metal outside covering normally presents a large coefficient of thermal expansion, thereby leading to large thermomechanical stresses between the relatively cold covering and the relatively hot inside wall, which stresses are particularly great when a cryogenic propellant, such as liquid hydrogen, passes through the cooling circuit of the combustion chamber. Furthermore, the hydrogen may also have harmful effects on the mechanical connections of the outside covering with the inside wall and with other elements made of metal.

In order to solve these problems, and also in order to reduce the cost and the time required for fabricating the combustion chamber, proposals have been made to use organic matrix composite materials in the outside covering. Such organic materials present the advantage of providing thermomechanical properties that are better adapted to the stresses to which the outside covering of the combustion chamber is subjected, while being lighter in weight and better at withstanding hydrogen contamination, and also having a coefficient of thermal expansion that is relatively small. Nevertheless, it is difficult to provide a good mechanical connection between such materials and elements made of metal such as the inside wall. Metal connections have been proposed, but their weight nevertheless negates a large amount of the advantage due to the lightness of the outside covering made of organic matrix composite material.

OBJECT AND SUMMARY OF THE INVENTION

The present disclosure seeks to remedy those drawbacks. More specifically, the disclosure seeks to provide a propulsion chamber for a liquid propellant rocket engine, the propulsion chamber comprising at least an inside wall made of metal, an outside covering made of organic matrix composite material, and a cooling circuit, which chamber provides reduced weight while providing good mechanical connection between the outside covering and the inside wall.

This object is achieved by the fact that the combustion chamber further comprises at least a first axial endpiece secured to the metal inside wall and presenting at least one radial protrusion received in a concave recess in an inside face of the outside wall, this concave recess being situated axially between first and second belts of reinforcing fibers oriented substantially circumferentially in said outside covering.

By means of these provisions, said reinforcing fiber belts are effective in holding the radial protrusion in the concave recess, thereby providing a particularly strong mechanical connection between the outside covering and the endpiece to which the outside covering is secured.

Organic matrix composite materials include in particular materials that are reinforced with carbon fibers. Carbon fibers present mechanical properties that are very useful, in particular great traction strength, and also a coefficient of thermal expansion that is comparatively small, and even in certain circumstances negative. Organic matrix composite materials reinforced by carbon fibers can thus present thermomechanical properties that are very advantageous, and in particular a coefficient of thermal expansion that is almost zero in certain directions, depending on the orientations selected for the reinforcing fibers. Consequently, and in particular in order to reduce thermomechanical stresses on the outside covering and on its connection with the endpiece, and also on the inside wall, said organic matrix composite material may have reinforcing fibers made of carbon.

In order to hold the outside covering against the endpiece, thereby making the mechanical connection between them even more secure, said reinforcing fiber belts may surround at least one inner layer of the outside covering. Furthermore, the reinforcing fiber belts may be prestressed in tension in order to clamp better onto the endpiece. The radial protrusion may extend over a perimeter of the first axial endpiece in order to provide connection therewith all around its perimeter.

The inside wall may form a throat of a convergent-divergent nozzle, thus enabling the throat to be cooled by the cooling circuit. Under such circumstances, the propulsion chamber may also further include an annular part interposed between the inside wall and a cylindrical segment of the outside covering around said nozzle throat, thereby holding the nozzle throat without complicating fabrication of the outside covering.

In order to transmit force at least axially between the annular part and the outside covering without passing via the inside wall, the propulsion chamber may further comprise a connection device suitable for providing this transmission. By way of example, the connection device may comprise a cleat and a peg.

In particular for the purpose of simplifying fabrication of the cooling circuit, the propulsion chamber may further comprise a sealing barrier between the cooling circuit and the outside covering. By way of example, the sealing barrier may be formed by a polyimide film suitable for being exposed to cryogenic temperatures, even though it is equally possible to envisage other materials, in particular polymers that are similarly suitable for being exposed to such temperatures.

Normally, the connection between the outside covering and the inside wall is provided at the two ends of the propulsion chamber. For this purpose, the propulsion chamber may include a second axial endpiece secured to the other end of said inside wall and presenting at least one other radial protrusion received in another concave recess of the inside face of the outside covering, this other concave recess being situated axially between third and fourth belts of reinforcing fibers oriented substantially circumferentially in said outside covering. Nevertheless, it is also possible to envisage using alternative connection means for this other end.

The present disclosure also relates to a method of fabricating such a propulsion chamber, the method comprising at least placing fibers around a core incorporating at least said first endpiece in order to form at least an inner layer of the outside covering, the fibers fitting closely over an outline of the radial protrusion of at least the first endpiece in order to form the concave recess in which the radial protrusion is received, winding additional reinforcing fibers in a substantially circumferential direction in order to form at least said first and second belts of reinforcing fibers, impregnating the fibers with a liquid resin, and hardening the resin in order to form the organic matrix of the composite material of the outside covering. The order in which the steps are listed does not in any way imply that they are implemented in any particular order. More specifically, the fibers placed around the core to form at least the inner layer of the covering may be impregnated with liquid resin before, during, and/or after the step of being put into place. The resin may be a thermosetting resin, with hardening then being provided by baking, however it could alternatively be a thermoplastic resin, with hardening then being provided by cooling.

By means of the method, the mechanical connection between the covering and the endpiece is further reinforced, in particular by adhesion between the thermosetting resin and the endpiece. In order to further improve this adhesion, a surface of the endpiece that comes directly into contact with the liquid resin may be roughened, e.g. by fabricating the radial protrusion by additive fabrication.

In a first alternative, the core around which the fibers are put into place in order to form the outside covering may include a main body that is suitable for being removed after the resin has been hardened, so as to be replaced inside the outside covering by the cooling circuit and by the inside wall. Thus, after hardening, the main body of the core may be extracted from the inside of the outside covering and the inside wall and the cooling circuit of the propulsion chamber may be inserted inside the outside covering and fastened to the first endpiece, e.g. by welding.

In a second alternative, said core may also incorporate at least the inside wall and the cooling circuit, not including the first endpiece. Thus, the outside covering may be formed directly on that assembly.

Furthermore, several alternative methods may be used for putting the fibers into place. Thus, the fibers may be braided or they may be laid by filamentary winding around the core, or sheets incorporating said fibers may be draped around the core, so as to form at least the inner layer of the outside covering.

Furthermore, said radial protrusions of at least one endpiece may be fabricated by an additive fabrication method, so as to obtain surface roughness providing greater adhesion with the outside covering.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 1:
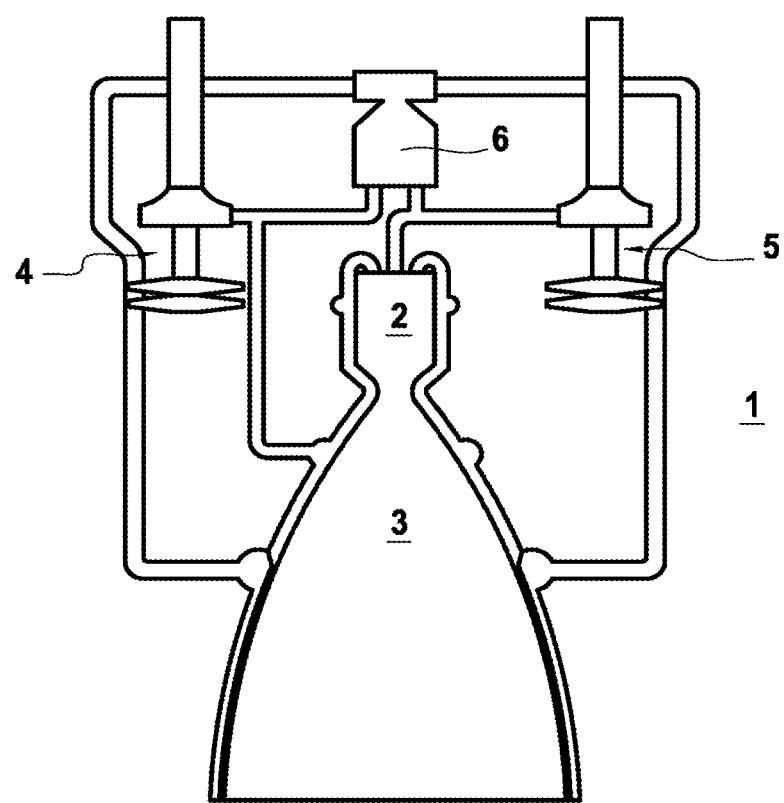
FIG. 1 is a diagrammatic view of a rocket engine.

FIG. 1 is a diagrammatic view of a liquid propellant rocket engine 1. The rocket engine 1 comprises: a propulsion chamber 2, itself comprising a combustion chamber 2a and a throat 2b of a convergent-divergent nozzle extended by a diverging portion 3; a first turbopump 4; a second turbopump 5; and a gas generator 6 for feeding the propulsion chamber 2 with propellants taken from corresponding tanks (not shown). Each of the turbopumps comprises at least one pump and at least one turbine connected together by a common rotary shaft so that the pump can be driven by the turbine via the rotary shaft.

In operation, a first liquid propellant, which may for example a cryogenic propellant such as liquid hydrogen, is pumped by the first turbopump 4 to the propulsion chamber 2 and to the gas generator 6. A second propellant, which may also be a cryogenic propellant such as liquid oxygen, is pumped by the second turbopump 5 likewise to the propulsion chamber 2 and to the gas generator 6. In the propulsion chamber 2, an exothermal chemical reaction between the two propellants generates combustion gas at high temperature, which gas is then accelerated to supersonic speed by expanding in the nozzle 2b so as to generate thrust by reaction in the opposite direction. As shown, the propulsion chamber 2 is cooled by the first propellant prior to being injected. Furthermore, the fractions of the propellants feeding the gas generator 6 also react therein in exothermal manner in order to generate combustion gas at high temperature, which gas expands in the turbines of the two turbopumps 4 and 5 so as to drive them.

Rocket engines having different configurations can also be envisaged. Thus, by way of example, in so-called "expander" cycle rocket engines, the turbopumps are not driven by combustion gas coming from the gas generator, but by at least one of the propellants after being heated by the heat given off in the combustion chamber. The present invention is equally applicable to such alternative configurations, and also to testing other types of machine.

Figure 2:
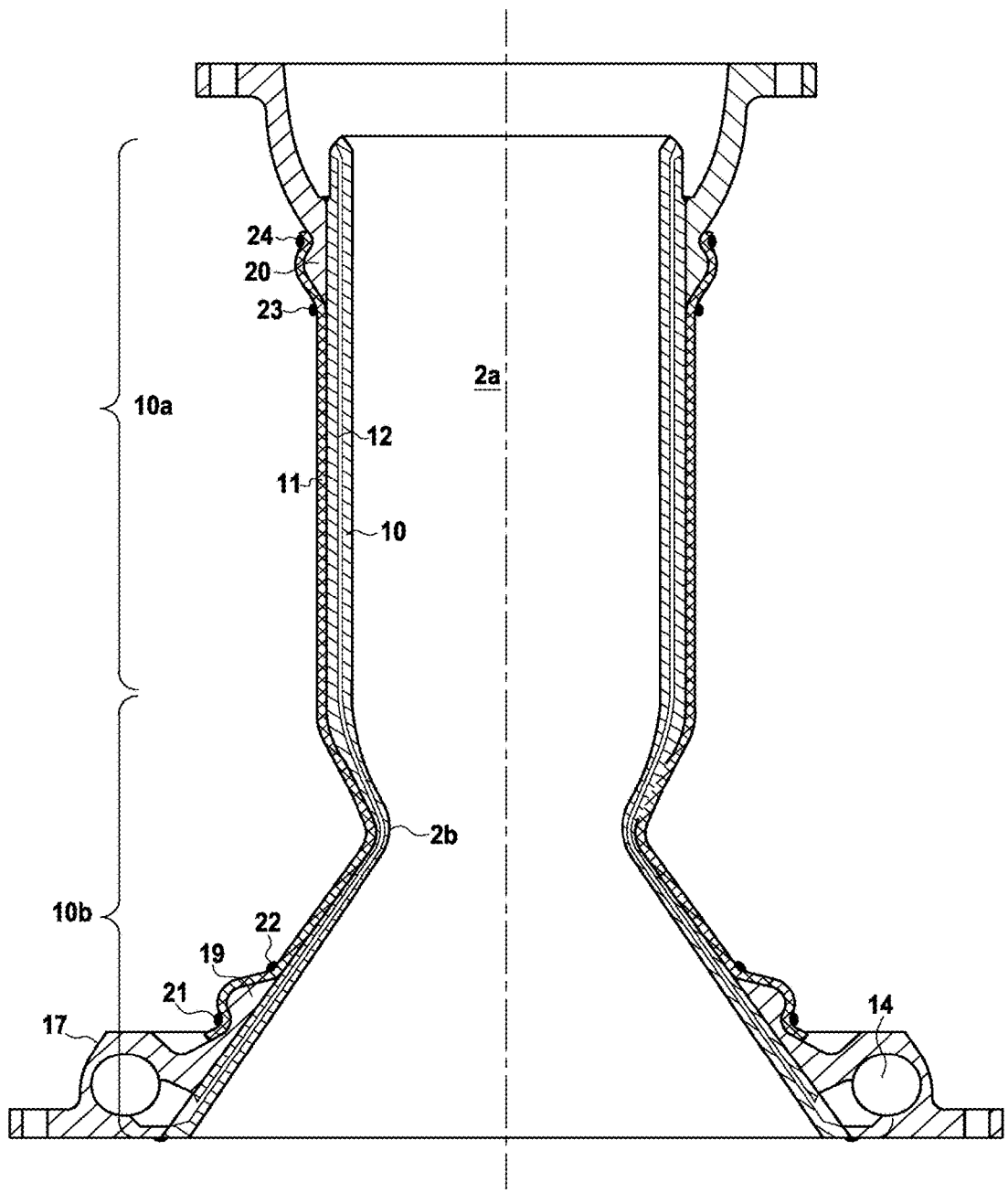
FIG. 2 is a longitudinal section of a propulsion chamber in a first embodiment.

FIG. 2 shows in greater detail a first embodiment of the propulsion chamber 2. As can be seen, the propulsion chamber 2 has an inside wall 10, an outside covering 11, and a cooling circuit 12 formed by channels formed in the inside wall 10. The inside wall 10 is made of a metal material having high thermal conductivity. The metal material may in particular be copper or an alloy having copper as its main component. It comprises a top segment 10a that is substantially cylindrical, defining the combustion chamber 2a, and a bottom segment 10b defining the throat 2b of the convergent-divergent nozzle downstream from the combustion chamber 2a.

The outside covering 11 is made of composite material comprising an organic matrix reinforced by fibers. Specifically, the organic matrix may be formed by a thermosetting resin such as an epoxy, phenolic, or bismaleimide (BMI) resin, or by a thermoplastic resin such as a polyamide, a polyether ether ketone (PEEK) resin, or a phenylene polysulfide (PPS) resin. Specifically, the reinforcing fibers may comprise carbon fibers, although it is possible to envisage using other fibers in combination with carbon fibers or as an alternative thereto. The reinforcing fibers may be structured in a stack of unidirectional layers, an arrangement of crossed fiber bundles, and/or they may be made by two- or three-dimensional weaving. In this first embodiment, the outside covering 11 fits closely to the outline of the inside wall 10, including over the throat 2b of the nozzle.

The channels of the cooling circuit 12 are arranged so as to convey the propellant from a feed volute 14 close to a bottom end of the propulsion chamber 1 to injectors (not shown) close to a top end of the propulsion chamber 1. In the embodiment shown, these channels 12 are embedded in the material of the inside wall. Nevertheless, it is also possible to envisage them being in the form of grooves formed in an outside surface of the inside wall 10. Specifically under such circumstances, a sealing film, e.g. of polyimide that is substantially leakproof against cryogenic hydrogen, such as poly(4,4'-oxydiphenylene-pyromellitimide) may be interposed between the channels of the cooling circuit 12 and the outside covering 11 so as to prevent leaks through the outside covering.

At each end, the propulsion chamber also has an axial endpiece 17 and 18 that is made of metal and that is secured to the inside wall 10. Each axial endpiece 17 and 18 may be formed integrally with the inside wall 10 and/or it may be fastened to the inside wall 10, e.g. by welding. Each axial endpiece 17 and 18 presents a radial protrusion 19 and 20 extending all around the perimeter of the corresponding axial endpiece 17 and 18. Nevertheless, as an alternative, each endpiece could present a plurality of local radial protrusions arranged around the corresponding perimeter.

Each radial protrusion 19 and 20 is received in a corresponding concave recess in an inside face of the outside covering 11. In order to hold each radial protrusion 19 and 20 axially in each corresponding concave recess, so as to fasten the external covering onto the axial endpieces 17 and 18 and the inside wall 10, belts 21, 22, 23, and 24 of reinforcing fibers are situated on an outside face of the outside covering 11, axially on either side of each radial protrusion 19 and 20 and the corresponding concave recess. The reinforcing fibers forming these belts 21 to 24 are oriented in substantially circumferential manner around the outside covering 11 and the corresponding axial endpiece 17 and 18. They may be prestressed in tension, so as to retain the axial endpieces 17 and 18 more securely regardless of the thermal expansion or contraction thereof.

Figure 3A:
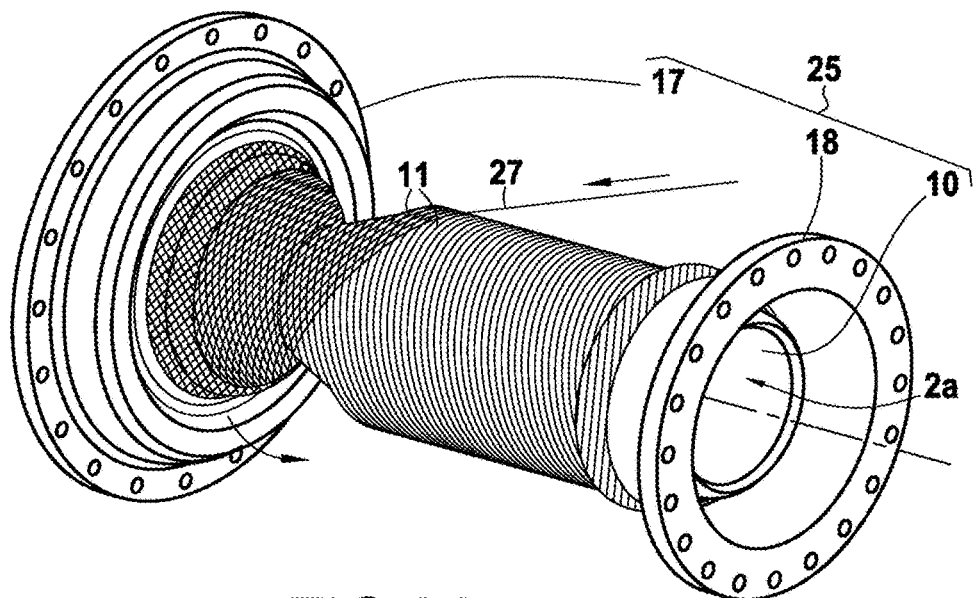
FIGS. 3A to 3C show steps of a method of fabricating the FIG. 2 propulsion chamber.
Figure 3B:
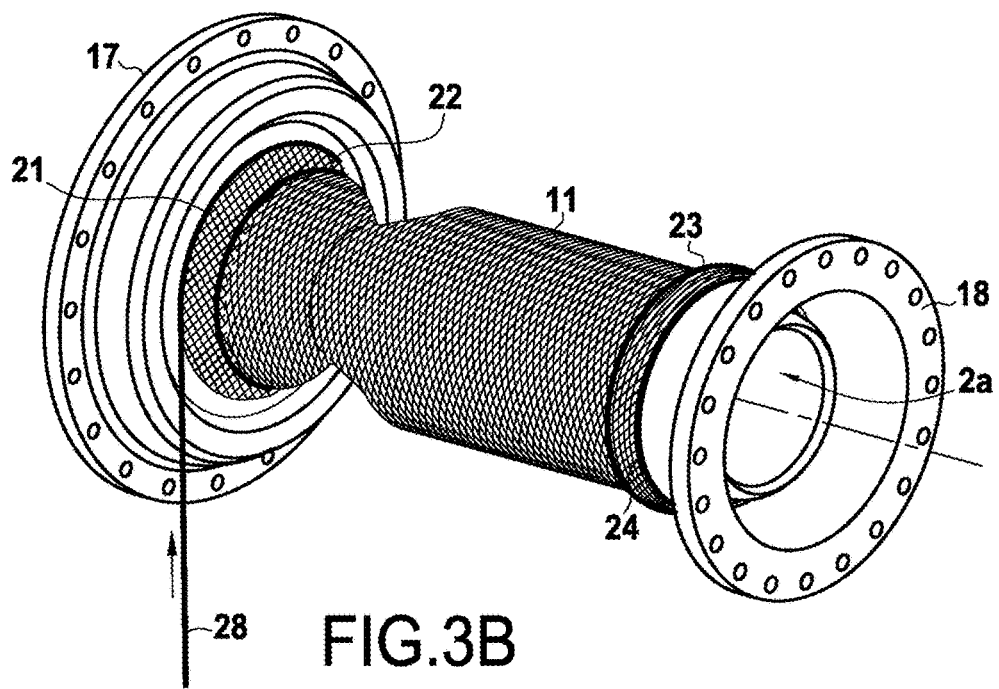
Figure 3C:
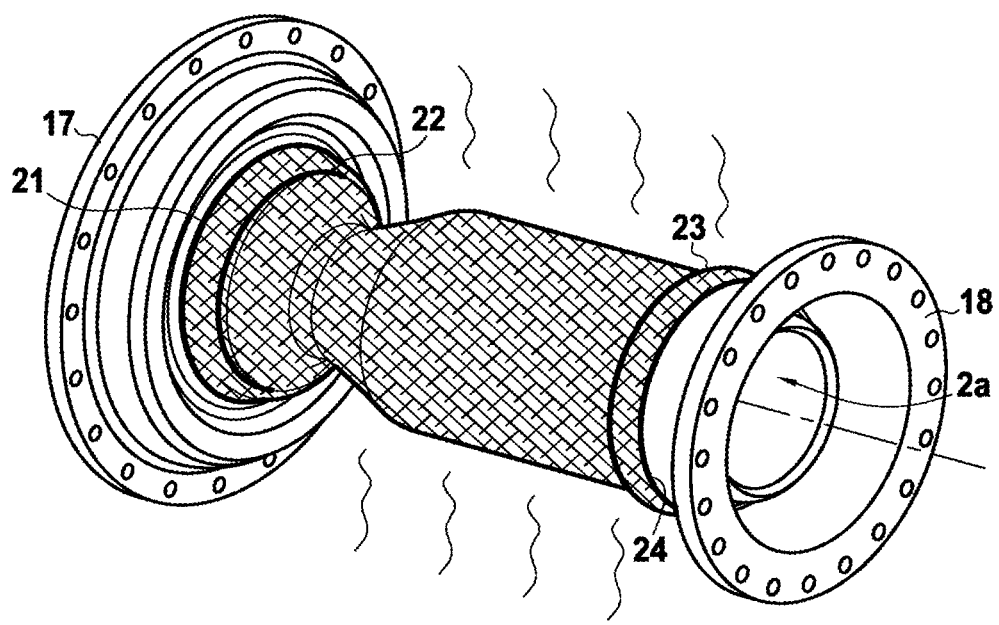

FIGS. 3A to 3C are diagrams showing three steps in a method of fabricating the propulsion chamber 2 in this first embodiment. In a first step, shown in FIG. 3A, a core 25 is provided formed by at least the inside wall 10 and the axial endpieces 17 and 18, and incorporating the cooling circuit 12, and reinforcing fibers 27 are impregnated in liquid resin and placed around the core 25 so as to form the outside covering 11. In the method shown, this is done by filamentary winding. During the winding, the impregnated fibers 27 fit closely to the outlines of the radial protrusions 19 and 20 of the axial endpieces 17 and 18 in order to form the concave recesses in which the radial protrusions 19 and 20 are received. Another possible way in which the fibers can be put into place in this example would be braiding on the same core 25. In a second step, shown in FIG. 3B, additional reinforcing fibers 28 are wound circumferentially around the core 25 and the fibers that have already been put into place, in order to form the belts 21 and 24 adjacent to the radial protrusions 19 and 20. During this step, it is possible to adjust the winding tension so as to establish prestress in tension for the additional reinforcing fibers 28 of the belts 21 to 24. Furthermore, the additional reinforcing fibers 28 forming the belts 21 to 24 need not be preimpregnated, since excess resin from the initial reinforcing fibers 27 may suffice to impregnate the belts 21 to 24. Nevertheless, it is also possible for the additional reinforcing fibers 28 to be pre-impregnated, as selected by the person skilled in the art. Finally, in a third step, shown in FIG. 3C, the resin is hardened. In the method shown, the resin is a thermosetting resin. Consequently, in this third step, hardening is performed by baking in an oven or an autoclave. Nevertheless, it is possible as an alternative to envisage using a thermoplastic resin, which becomes liquid on being heated, and then hardens during cooling.

Figure 4:
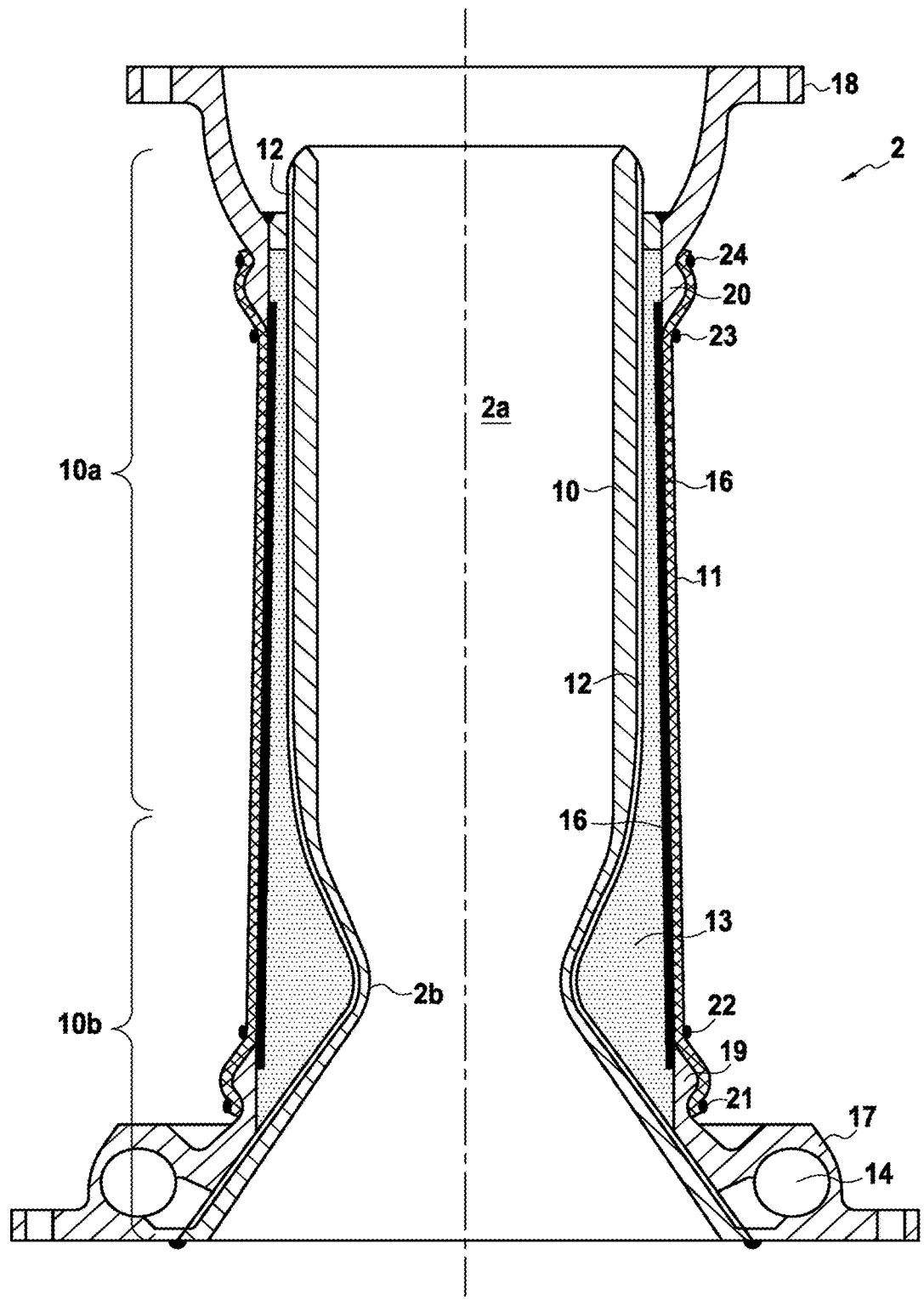
FIG. 4 is a longitudinal section view of a propulsion chamber in a second embodiment.
Figure 5A:
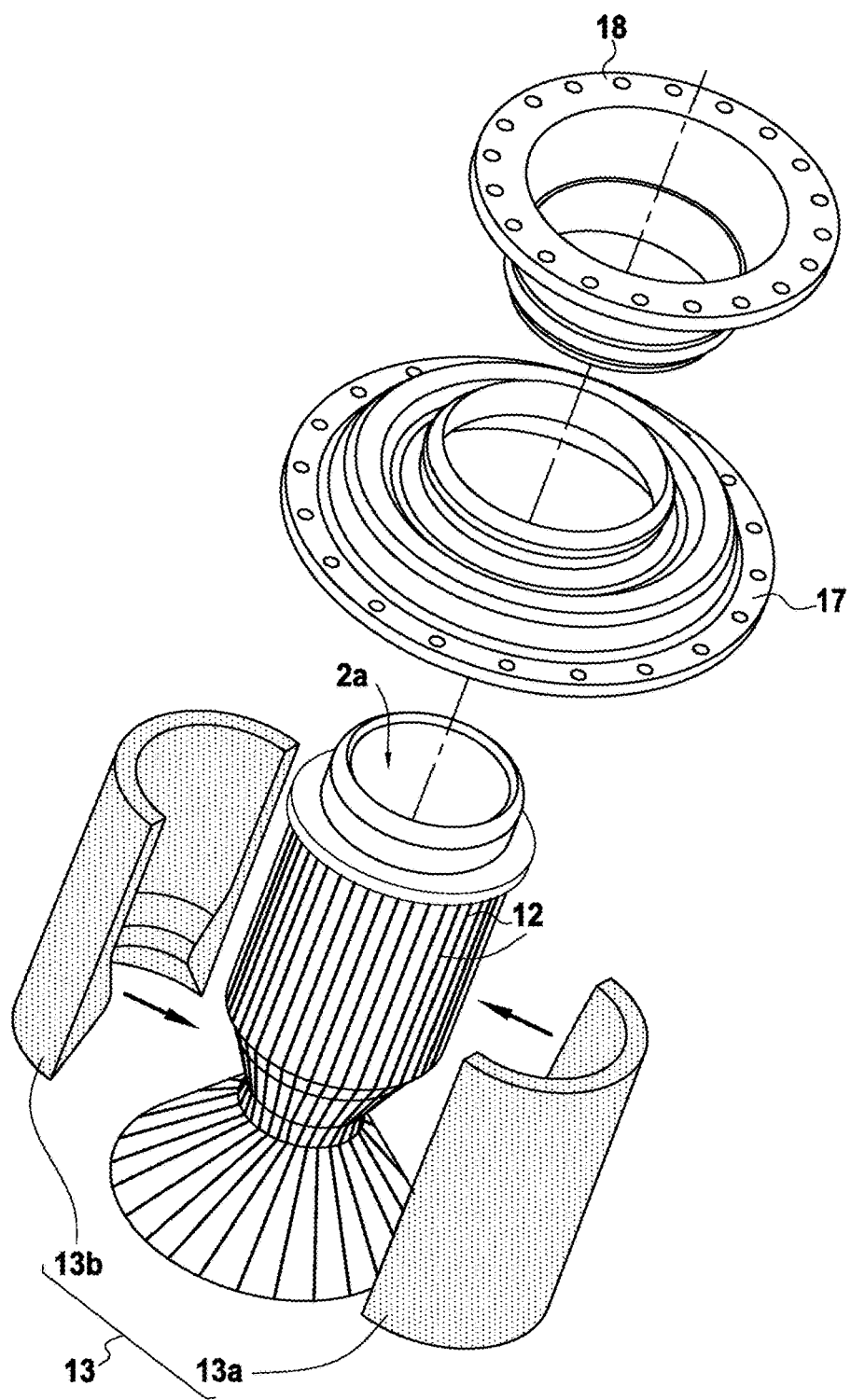
FIGS. 5A to 5E show steps of a first method of fabricating the FIG. 4 propulsion chamber.
Figure 5B:
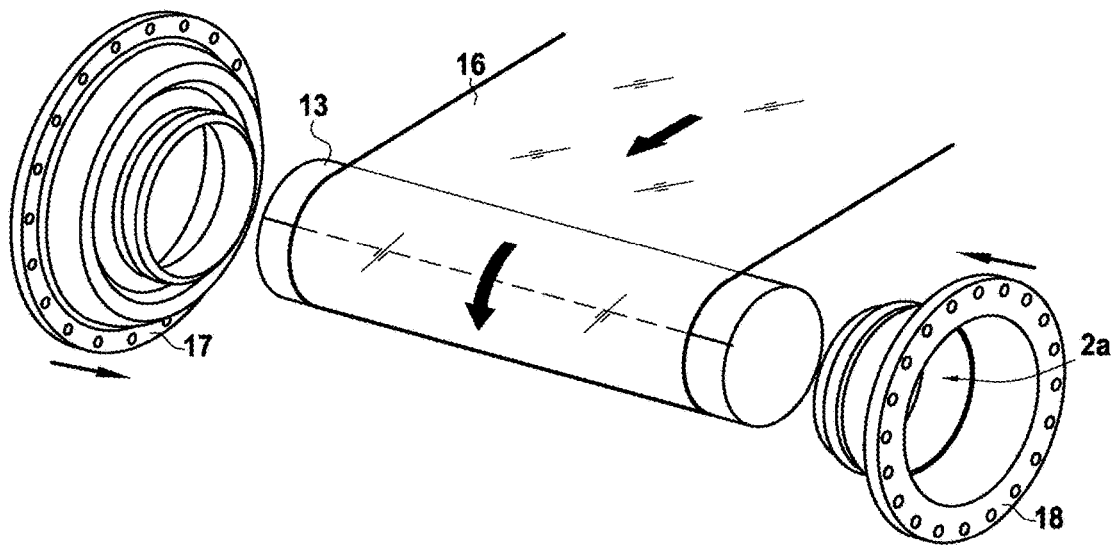
Figure 5C:
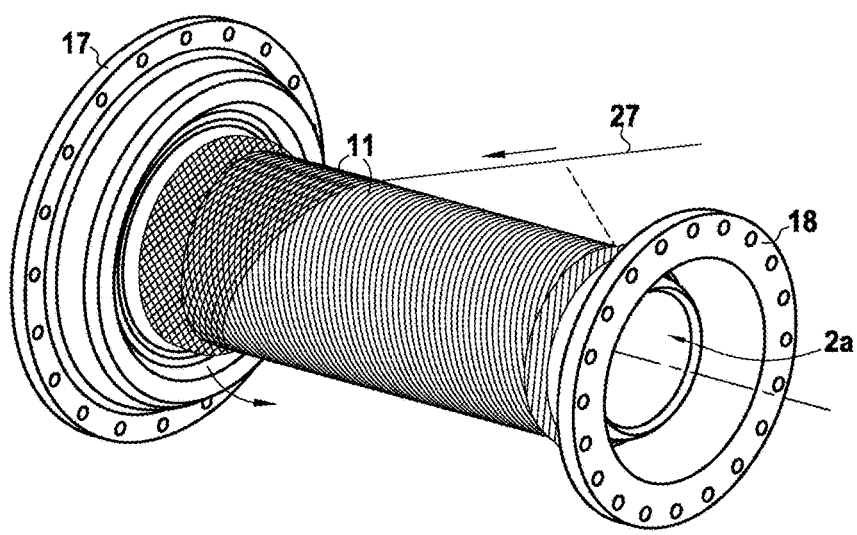
Figure 5D:
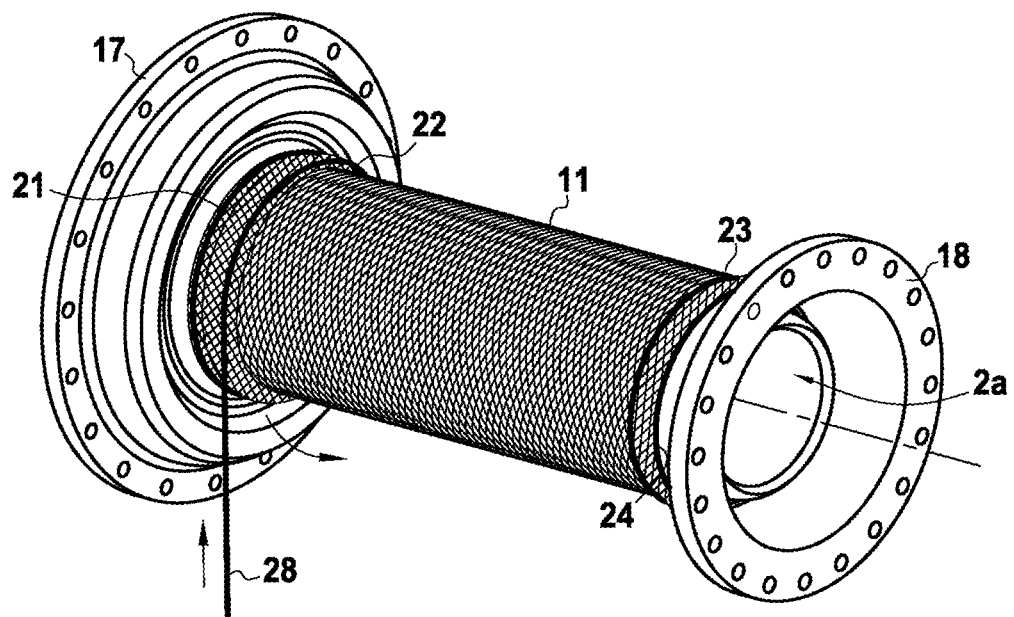
Figure 5E:
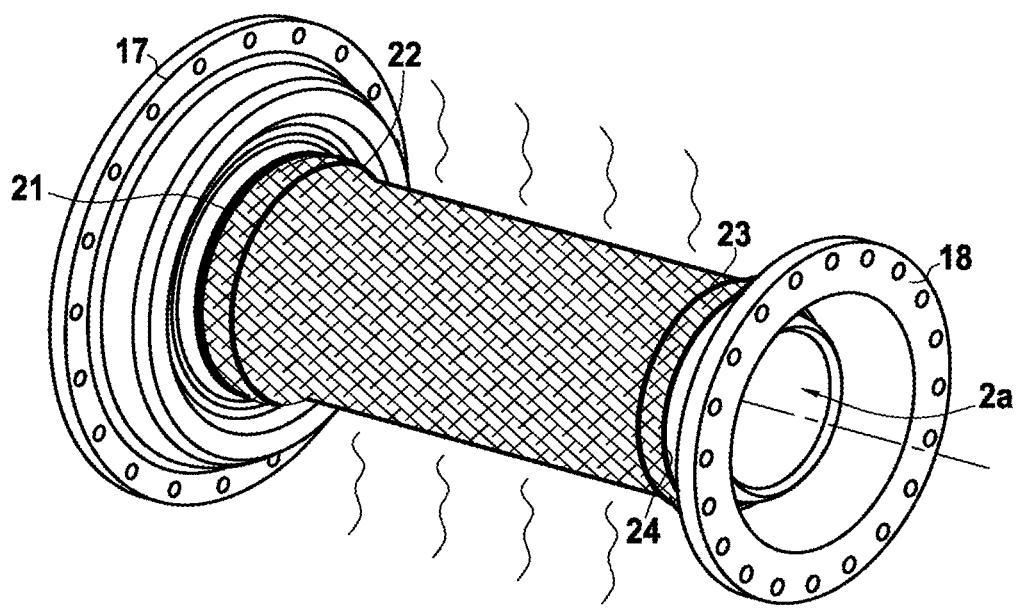

FIG. 4 shows a second embodiment of the propulsion chamber 2. In this second embodiment, the outside covering 11 is substantially cylindrical about the throat 2b, thereby leaving a large volume between the bottom segment 10b of the inside wall 10 and the outside covering 11. In order to fill this volume, at least in part, an annular part 13 is interposed between the inside wall 10 and the outside covering 11. This annular part 13 may be made mainly out of polymer material, e.g. a polyimide, or out of a metal material, which may be solid or cellular, and it may be a single piece or it may be the result of assembling together a plurality of elements, e.g. two half-shells that may optionally be bound together. As mentioned above as an alternative in the description in the first embodiment, the channels 12 are in the form of grooves formed in the outside surface of the inside wall 10 together with a sealing film, e.g. made of a polyimide that is substantially leakproof to cryogenic hydrogen, such as poly (4,4'-oxydiphenylene-pyromellitimide), is interposed between the channels of the cooling circuit 12 and the outside covering 11 so as to prevent leaks through the outside covering. More specifically, in this second embodiment, the sealing film 16 is interposed between the annular part 13 and the outside covering 11. The remainder of the propulsion chamber 2 in this second embodiment is analogous to that in the first embodiment, and the equivalent elements are given the same references in the drawings.

FIGS. 5A to 5E are diagrams showing five steps of a method enabling the propulsion chamber 2 in this second embodiment to be fabricated. In a first step, shown in FIG. 5A, two half-shells 13a and 13b forming the annular part 13 are assembled around the narrowing of the bottom segment 10b of the inside wall 10 with at least the inside wall 10 and the cooling circuit 12. In a second step, shown in FIG. 5B, the sealing film 16 is put into place around this assembly and the axial endpieces 17 and 18 are fitted on the assembly formed by the inside wall 10 together with the annular part 13 covered by the sealing film 16 in order to form the core 25. In a third step, shown in FIG. 5C, and analogous to that of the method shown for the first embodiment, reinforcing fibers 27 are impregnated with liquid resin and put into place around the core 25 partially covered by the sealing film 16, so as to form the outside covering 11. As for the first embodiment, this may be done by filamentary winding or alternatively by braiding. While they are being put into place, the impregnated fibers 27 match the outlines of the radial protrusions 19 and 20 of the axial endpieces 17 and 18 so as to form the concave recesses in which these radial protrusions 19 and 20 are received. In a fourth step, shown in FIG. 5D, additional reinforcing fibers 28 are wound circumferentially around the core 25 and the fibers that have already been put into place in order to form the belts 21 to 24 adjacent to the radial protrusions 19 and 20. During this step, it is also possible to adjust the winding tension so as to establish tension prestress in the additional reinforcing fibers 28 of the belts 21 to 24. Furthermore, and as for the first embodiment, the additional reinforcing fibers 28 forming the belts 21 to 24 need not be preimpregnated, since excess resin from the initial reinforcing fibers 27 may be sufficient for impregnating the belts 21 to 24. Nevertheless, these additional reinforcing fibers 28 may also be preimpregnated, as selected by the person skilled in the art. Finally, in a fifth step, shown in FIG. 5E, the resin is hardened, so as to harden the outside covering 11. In the method shown, the resin is a thermosetting resin. Consequently, in this fourth step, hardening is performed by baking in an oven or an autoclave. Nevertheless, it is possible as an alternative to use a thermoplastic resin that becomes liquid when hot and that hardens on cooling.

Nevertheless, the cylindrical shape of the outside covering 11 also makes it possible to fabricate the propulsion chamber 2 using an alternative method as shown in FIGS. 6A to 6F, in which the outside covering 11 is initially shaped and baked, with the inside wall 10 together with the cooling circuit 12 and the annular part 13 subsequently being inserted into the inside of the outside covering 11. In a first step of this other method, shown in FIG. 6A, reinforcing fibers 27 are impregnated with liquid resin and put into place around a core 25' that is partially separable, so as to form the outside covering 11. As in the first embodiment, this may be done by filamentary winding. The partially separable core 25' comprises an extractor main body 26 between the two radial endpieces 17 and 18. As in the preceding method, while these reinforcing fibers are being put into place, the impregnated fibers 27 fit closely over the outlines of the radial protrusions 19 and 20 of the axial endpieces 17 and 18 so as to form the concave recesses in which the radial protrusions 19 and 20 are received. During a second step, shown in FIG. 6B, additional reinforcing fibers 28 are wound circumferentially around the core 25' and the fibers 27 already in place so as to form the belts 21 to 24 adjacent to the radial protrusions 19 and 20. During this step, it is also possible to adjust the winding tension so as to establish tension prestress in the additional reinforcing fibers 28 of the belts 21 to 24. Furthermore, as in the first embodiment, the additional reinforcing fibers 28 forming the belts 21 to 24 need not be preimpregnated, since excess resin of the first reinforcing fibers 27 may suffice for impregnating the belts 21 to 24. Nevertheless, these additional reinforcing fibers 28 may also be preimpregnated, as selected by the person skilled in the art. Thereafter, in a third step, shown in FIG. 6C, the resin is hardened, so as to harden the outside covering 11. In the method shown, the resin is a thermosetting resin. Consequently, in this third step, hardening is performed by baking in an oven or an autoclave. Nevertheless, in this method, it is also possible as an alternative to envisage using a thermoplastic resin that becomes liquid when hot and that hardens on cooling. After this hardening, in a fourth step shown in FIG. 6D, the removable core 25' is removed by extracting its main body 26 from the inside of the outside covering 11. However, the axial endpieces 17 and 18 remain fastened to the two ends of the outside covering 11 as a result of their radial protrusions 19 and 20 being fitted in the complementary concave recesses in the inside surface of the outside covering 11. Thereafter, possibly after installing the sealing film 16 on an inside surface of the outside covering 11, e.g. using adhesive, the inside wall 10 together with the cooling circuit 12 and the annular part 13 is inserted inside the outside covering 11 in a fifth step shown in FIG. 6E so as to take the place of the main body 26 of the removable core 25' and be fastened at its two axial ends to the corresponding axial endpieces 17 and 18 in the position shown in FIG. 6F. This fastening may be provided by welding, for example.

Although in each of the above-described implementations of the fabrication method the reinforcing fibers 27 of the outside covering are put into place by filamentary winding of fibers that are already resin-impregnated around the core, it is also possible to envisage alternative methods in which the fibers are put into place other than by filamentary winding and/or are put into place dry and impregnated subsequently. One such other fabrication method is shown in FIGS. 7A to 7G.

Figure 7A:
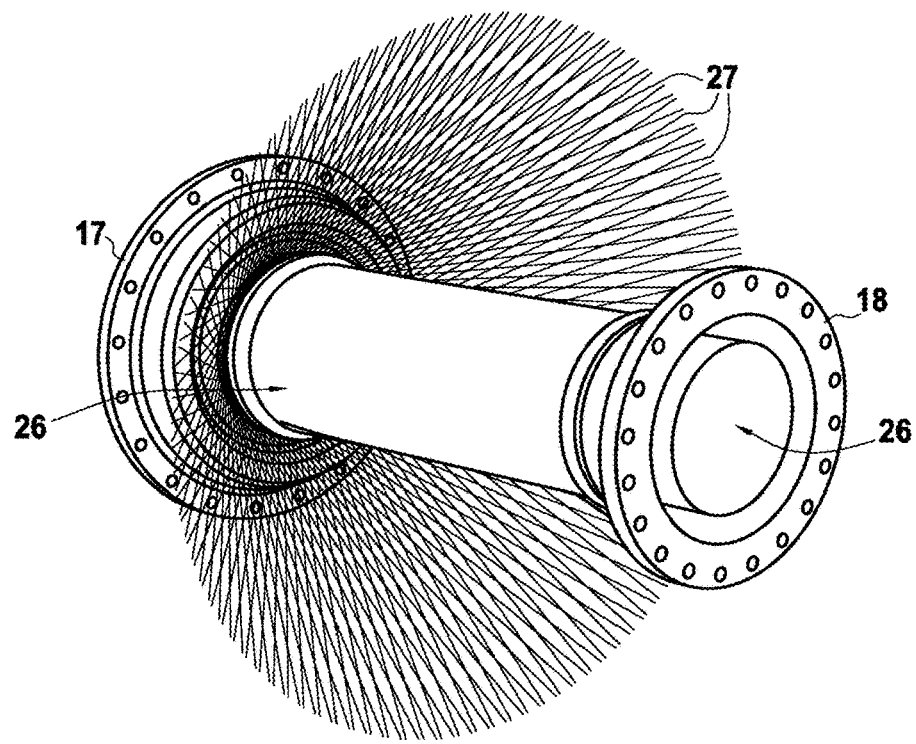
FIGS. 7A to 7G show steps of a third method of fabricating the FIG. 4 propulsion chamber.
Figure 7B:
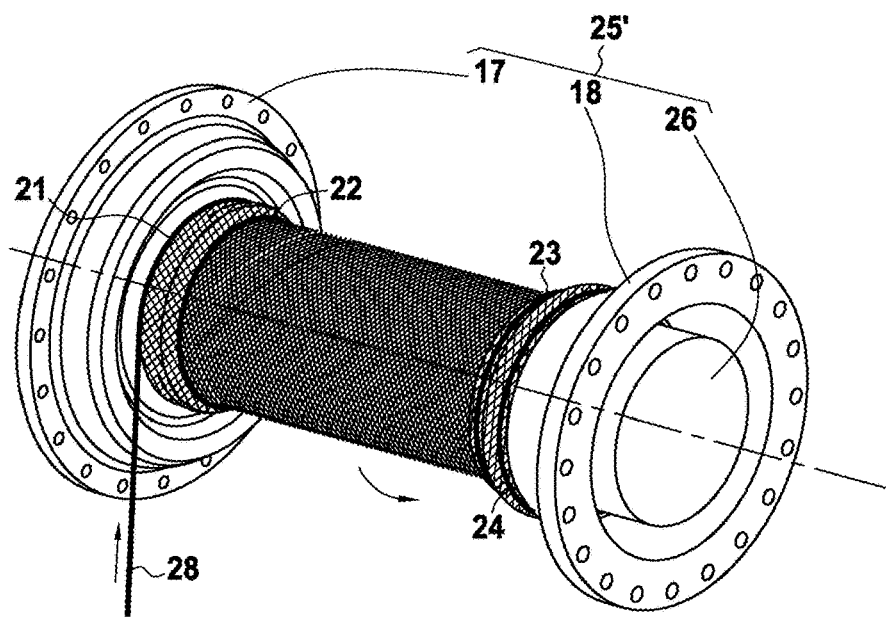

In a first step, shown diagrammatically in FIG. 7A, dry reinforcing fibers 27 are put into place on the partially separable core 25'. These fibers 27 are braided in two- or three-dimensional manner around the core 25' in one or more superposed layers. Thereafter, in a second step shown in FIG. 7B, additional reinforcing fibers are wound circumferentially around the core 25' and the fibers that have already been put into place in order to form the belts 21 to 24 adjacent to the radial protrusions 19 and 20. During this step, it is also possible to adjust the winding tension so as to establish tension prestress in the reinforcing fibers of the belts 21 to 24.

Figure 7C:
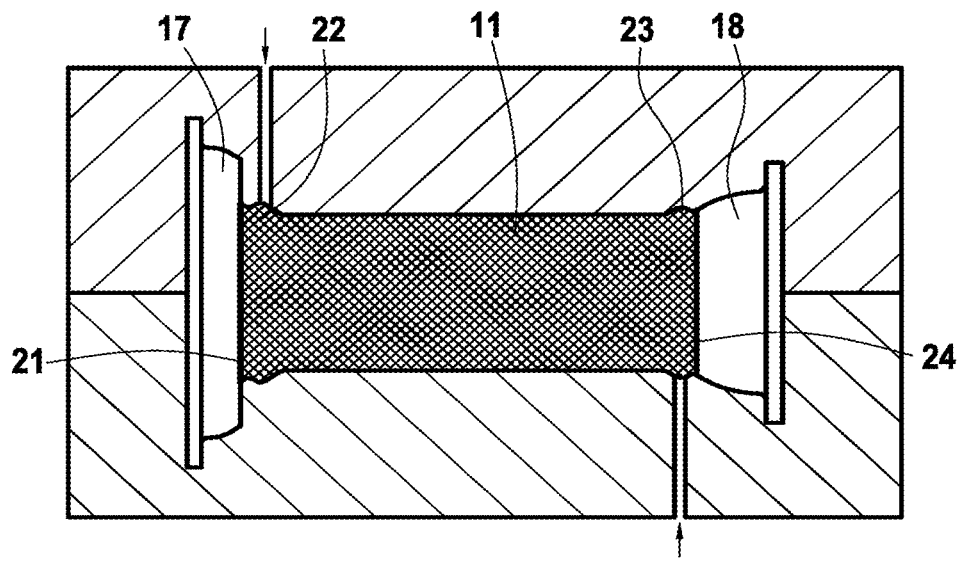
Figure 7D:
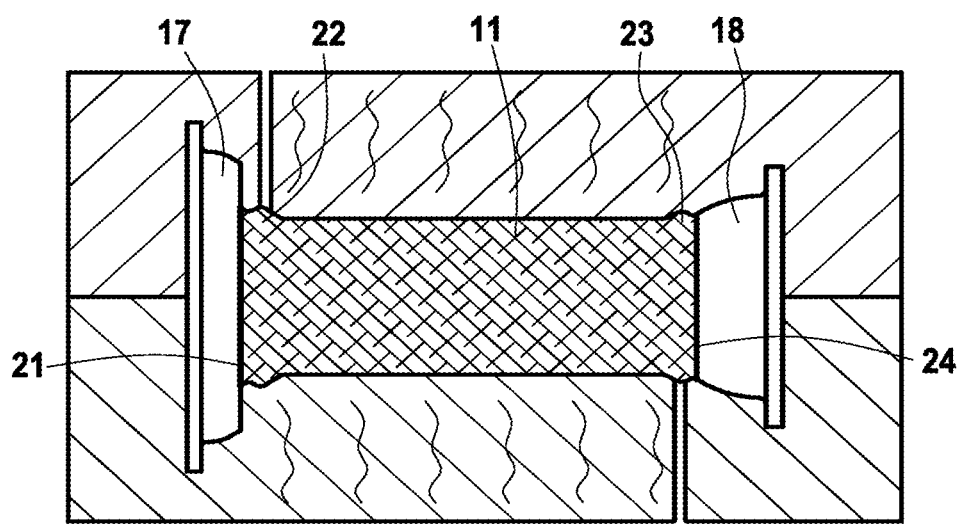

In order to impregnate the reinforcing fibers with resin, the core 25' covered by these fibers it then inserted into a shaping mold 50 into which the thermosetting resin is injected under pressure and possibly while hot, as shown in FIG. 7C. It is also possible for the mold to be heated prior to injection. In the following step, shown in FIG. 7D, while the mold 50 is still closed, the assembly is heated in order to harden the resin and thus form the organic matrix of the outside covering 11, by the resin transfer molding (RTM) method. Nevertheless, as an alternative, a low viscosity thermoplastic resin could be injected in analogous manner, while hot, into the mold 50 and then cooled in order to harden it.

Figure 6A:
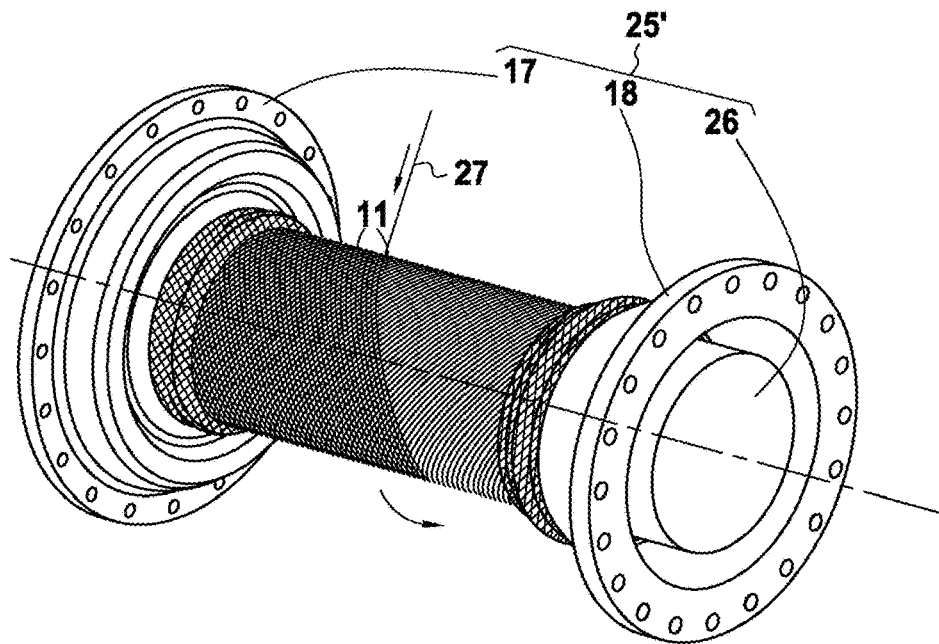
FIGS. 6A to 6F show steps of a second method of fabricating the FIG. 4 propulsion chamber.
Figure 6B:
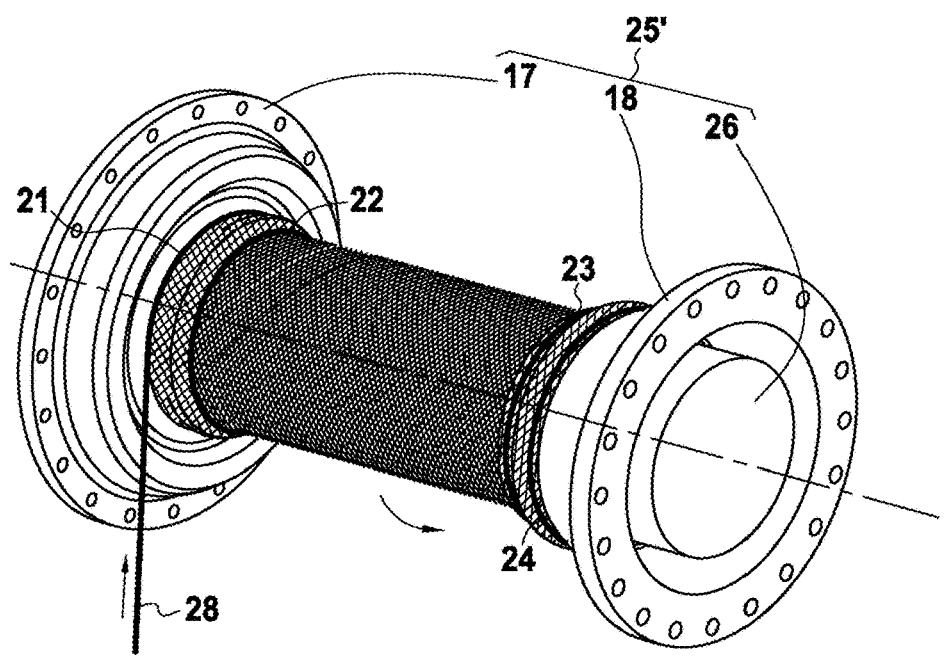
Figure 6C:
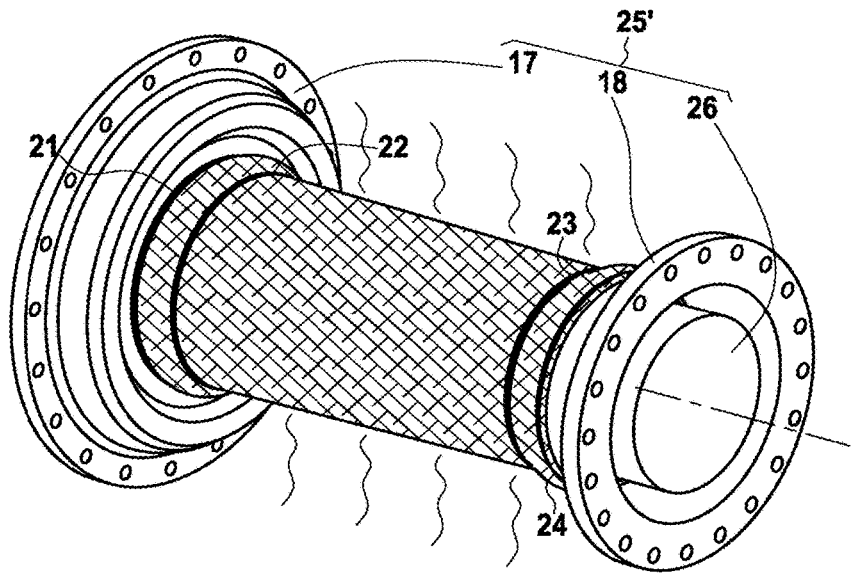
Figure 6D:
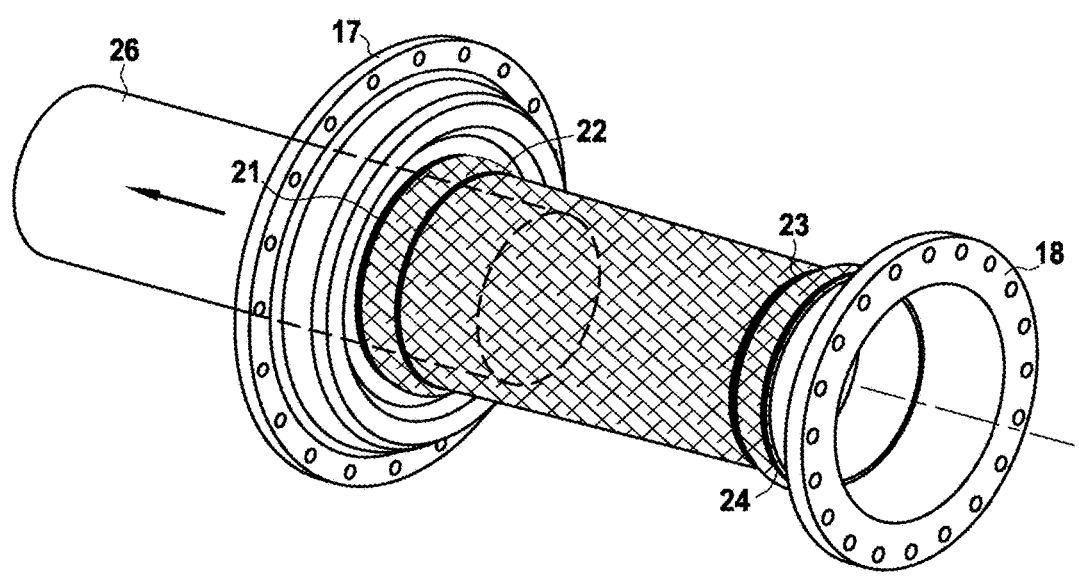
Figure 6E:
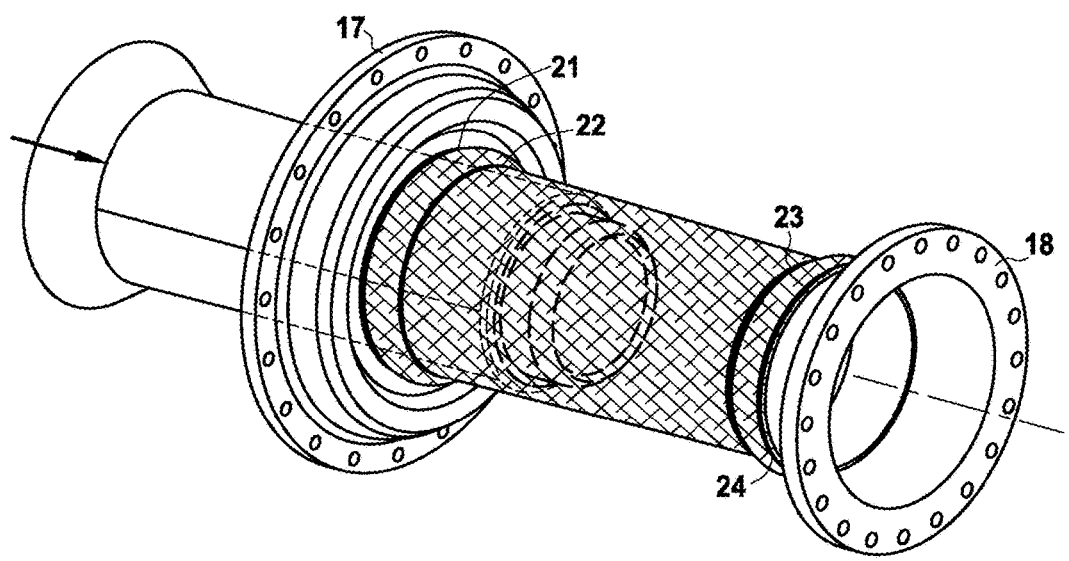
Figure 6F:
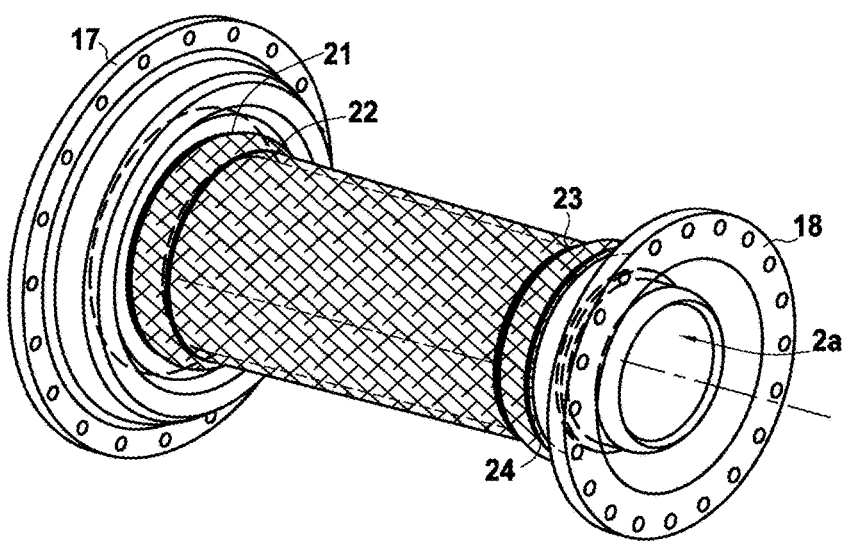
Figure 7E:
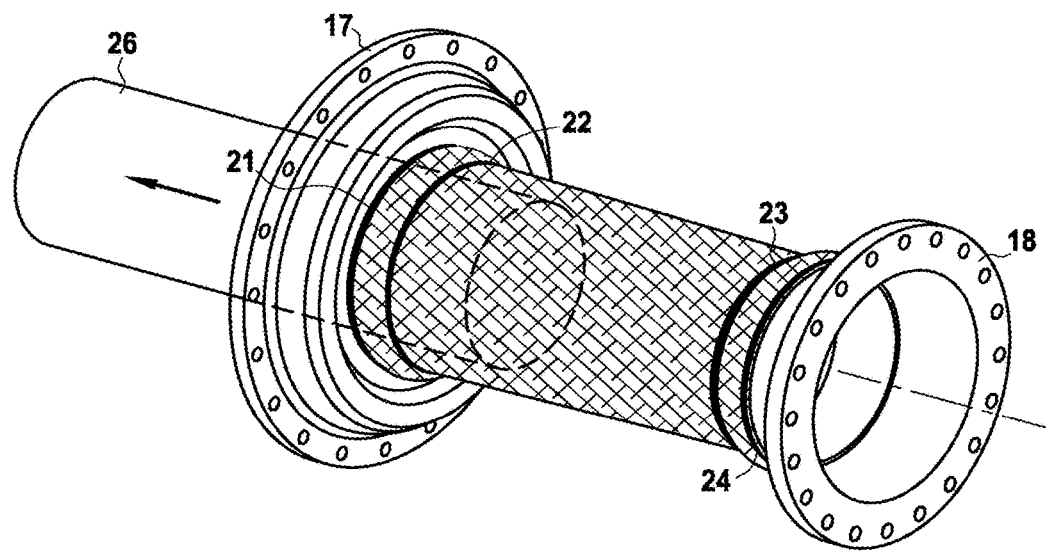
Figure 7F:
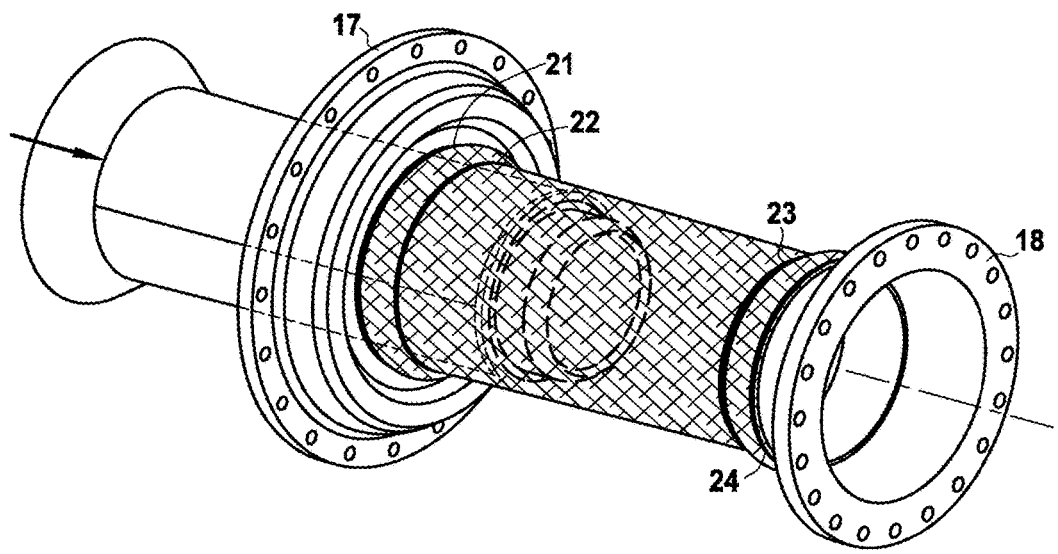
Figure 7G:
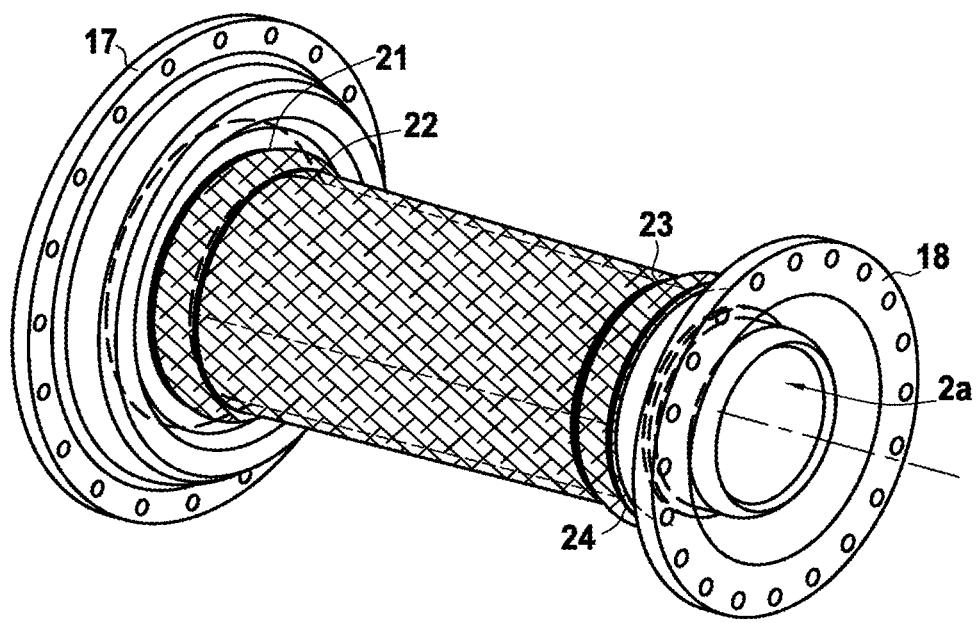

After the resin has hardened, the core 25' together with the outside covering 11 can be extracted from the mold 50 and subsequently subjected to the steps shown in FIGS. 7E to 7G that are analogous to the steps shown in FIGS. 6D to 6F for the preceding method. Thus, the removable core 25' is removed, as shown in FIG. 7E, by extracting its main body 26 from the inside of the outside covering 11 while leaving the axial endpieces 17 and 18 fastened to the two ends of the outside covering 11 as a result of their radial protrusions 19 and 20 being fitted in the complementary concave recesses in the inside surface of the outside covering 11. Thereafter, possibly after installing the sealing film 16 on an inside surface of the outside covering 11, e.g. using adhesive, the inside wall 10 together with the cooling circuit 12 and the annular part 13 is inserted into the inside of the outside covering 11, as shown in FIG. 7F, as a replacement for the main body 26 of the removable core 25' and fastened at its two axial ends to the corresponding axial endpieces 17 and 18 in the position shown in FIG. 7G.

Figure 8A:
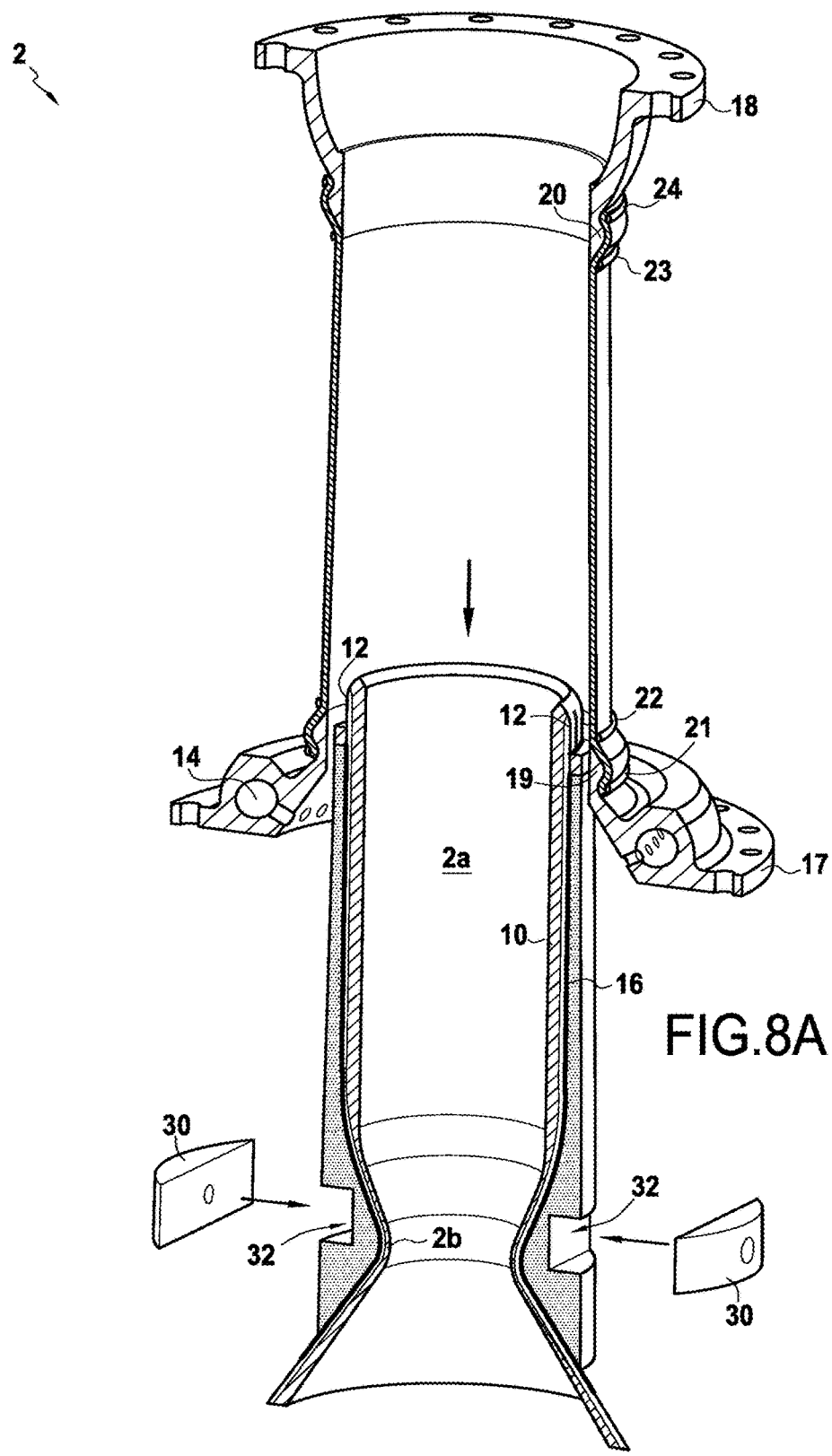
FIGS. 8A and 8B show two steps of assembling a propulsion chamber in a third embodiment.
Figure 8B:
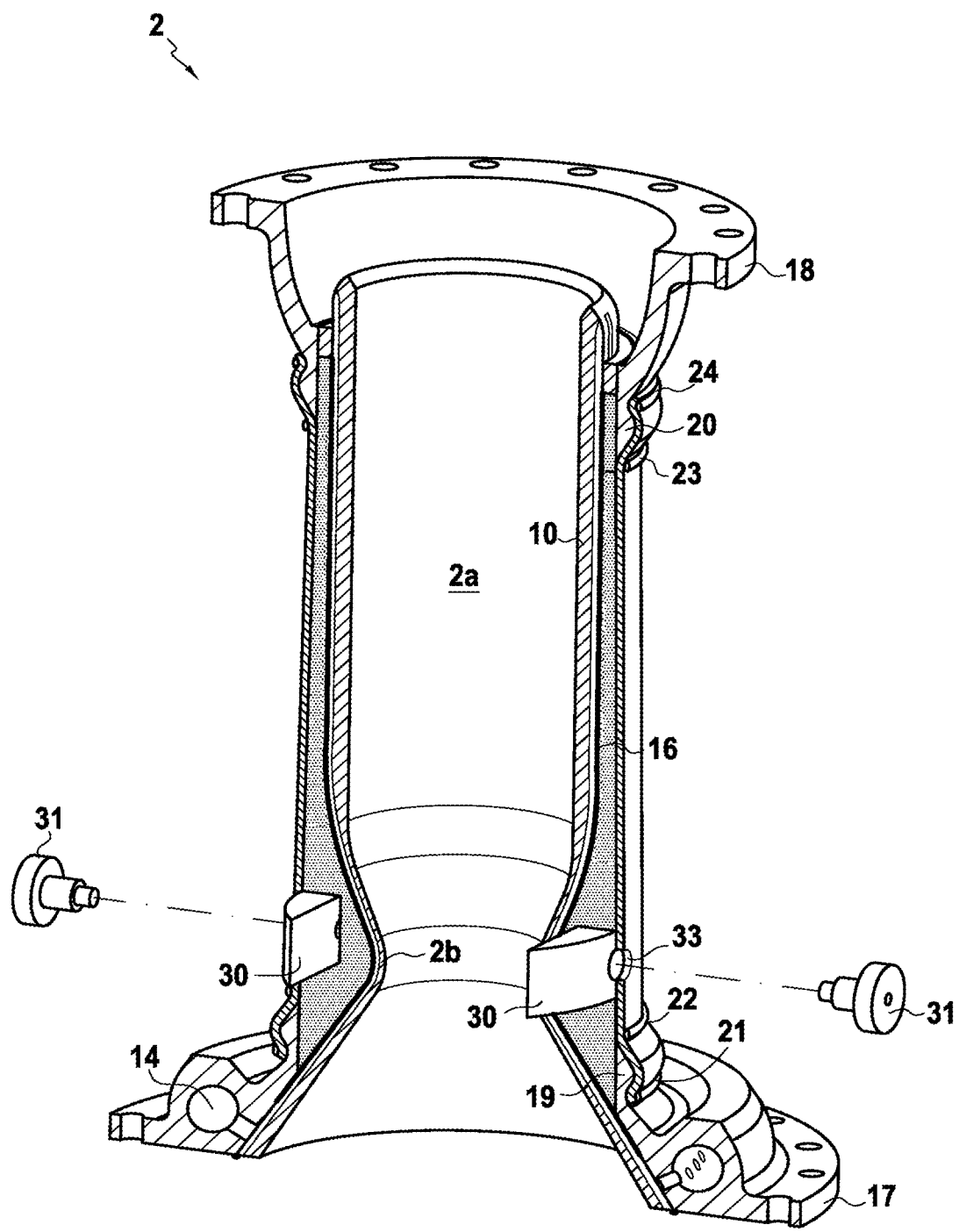

Finally, FIGS. 8A and 8B show a third embodiment, which is a variant of the propulsion chamber of the second embodiment, and in which, in order to transmit to the outside covering 11 the mainly axial forces associated with the end effects exerted by the combustion gas on the throat 2b directly from the annular part 13 and without passing via the inside wall 10, at least one connection device comprising a cleat 30 and a peg 31 is placed between the annular part 13 and the outside covering 11. The cleat 30 is received in a transfer slot 32 in an outside surface of the annular part 13 so as to transmit substantially axial forces from the annular part 13 to the cleat 30. When the annular part 13 is constituted by two half-shells 13a and 13b, as in the embodiment shown, each notch 32 may extend over two adjacent half-shells 13a and 13b so as to transmit axial forces from both half-shells 13a and 13b to the cleat 30. One end of the pin 31 may be received in the cleat 30 through an orifice 33 in the outside covering 11 in order to establish a mechanical connection between the cleat 30 and the outside covering 11. The pin 31 may be secured to the cleat 30 via a releasable connection of the nut-and-bolt type, for example. By way of example, the orifice 33 in the outside covering 11 may be made during molding of the outside covering 11 or by machining after hardening the liquid resin that forms the organic matrix of the outside covering 11. The edge of this orifice 33 may be reinforced, e.g. with additional layers of reinforcing fibers. In this embodiment, in order to avoid the film 16 being pierced by the pegs 31, the film 16 is situated between the inside wall 10 and the half-shells 13a and 13b. The remaining elements of the propulsion chamber 1 in this third embodiment remain equivalent to those described for the second embodiment.

Although the present invention is described with reference to specific embodiments, it is clear that various modifications and changes may be made to these embodiments without going beyond the general scope of the invention as defined by the claims. In addition, individual characteristics of the various embodiments described may be combined in additional embodiments. In particular, the various alternative fabrication methods described for the second embodiment may optionally be adapted to fabricating propulsion chambers in accordance with any of the other described embodiments. Consequently, the description and the drawings should be considered in the sense that is illustrative rather than restrictive.

The invention claimed is:

1. A propulsion chamber for a liquid propellant rocket engine, the propulsion chamber having an axial centerline and comprising:
    an inside wall made of metal;
    an outside covering made of organic matrix composite material;
    a cooling circuit; and
    a first axial endpiece secured to a first end of the inside wall made of metal and comprising a first radial protrusion received in a first concave recess in an inside face of the outside covering, the concave recess being situated axially between a first belt of reinforcing fibers and a second belt of reinforcing fibers, the first belt of reinforcing fibers and the second belt of reinforcing fibers being oriented substantially circumferentially in said outside covering.

2. The propulsion chamber according to claim 1, wherein said organic matrix composite material includes other reinforcing fibers made of carbon.

3. The propulsion chamber according to claim 1, wherein said first belt of reinforcing fibers and second belt of reinforcing fibers surround at least one inner layer of the outside covering.

4. The propulsion chamber according to claim 1, wherein said first belt of reinforcing fibers and second belt of reinforcing fibers are prestressed in tension.

5. The propulsion chamber according to claim 1, wherein the first radial protrusion extends around a perimeter of the first axial endpiece.

6. The propulsion chamber according to claim 1, wherein the inside wall defines a throat of a convergent-divergent nozzle.

7. The propulsion chamber according to claim 6, further including an annular part interposed between the inside wall and a cylindrical segment of the outside covering around said nozzle throat.

8. The propulsion chamber according to claim 7, further comprising a connection device for transmitting an axial force between the annular part and the outside covering without the axial force being transmitted through the inside wall.

9. The propulsion chamber according to claim 1, further comprising a sealing barrier between the cooling circuit and the outside covering.

10. The propulsion chamber according to claim 1, including a second axial endpiece secured to a second end of said inside wall and presenting a second radial protrusion received in a second concave recess of the inside face of the outside covering, the second concave recess being situated axially between a third belt of reinforcing fibers and a fourth belt of reinforcing fibers, the third belt of reinforcing fibers and the fourth belt of reinforcing fibers being oriented substantially circumferentially in said outside covering.

11. A fabrication method for fabricating the propulsion chamber according to claim 1, the method comprising:
    forming an inner layer of the outside covering by placing fibers around a core incorporating said first axial endpiece, the fibers fitting closely over an outline of the first radial protrusion of the first axial endpiece in order to form the first concave recess in which the first radial protrusion is received;
    winding additional reinforcing fibers in a substantially circumferential direction in order to form at least said first belt of reinforcing fibers and said second belt of reinforcing fibers;
    impregnating the fibers with a liquid resin; and
    hardening the resin in order to form the organic matrix of the composite material of the outside covering.

12. The fabrication method according to claim 11, wherein, after the resin has been hardened, a main body of the core is extracted from inside of the outside covering and the inside wall and the cooling circuit of the propulsion chamber are inserted inside the outside covering and fastened to the first axial endpiece.

13. The fabrication method according to claim 11, wherein said core also incorporates at least the inside wall and the cooling circuit.

14. The fabrication method according to claim 11, wherein the forming the inner layer of the outside covering includes placing said fibers by at least one of two- or three-dimensionally braiding around the core.

15. The fabrication method according to claim 11, wherein the forming the inner layer of the outside covering includes placing the fibers around the core by draping, around the core, pre-impregnated sheets incorporating said fibers.

16. The fabrication method according to claim 11, wherein said first radial protrusion is fabricated by an additive fabrication method.

* * * * *

UNITED STATES PATENT AND TRADEMARK OFFICE
CERTIFICATE OF CORRECTION

| | |
|---|---|
| PATENT NO. | : 10,451,006 B2 |
| APPLICATION NO. | : 15/296537 |
| DATED | : October 22, 2019 |
| INVENTOR(S) | : Alban Du Tertre et al. |

It is certified that error appears in the above-identified patent and that said Letters Patent is hereby corrected as shown below:

On the Title Page

Item (71) should read:
--ARIANEGROUP SAS, Paris (FR)--

Signed and Sealed this
Fourteenth Day of April, 2020

Andrei Iancu
*Director of the United States Patent and Trademark Office*